(12) United States Patent
Philbrick et al.

(10) Patent No.: US 9,797,260 B2
(45) Date of Patent: Oct. 24, 2017

(54) ENGINE COMPONENT WITH WEAR SURFACE PROTECTION

(71) Applicant: UNITED TECHNOLOGIES CORPORATION, Hartford, CT (US)

(72) Inventors: Graham Ryan Philbrick, Coventry, CT (US); Ken Lagueux, Berlin, CT (US); Bret M. Teller, Meriden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 281 days.

(21) Appl. No.: 14/694,416

(22) Filed: Apr. 23, 2015

(65) Prior Publication Data

US 2015/0308274 A1 Oct. 29, 2015

Related U.S. Application Data

(60) Provisional application No. 61/982,927, filed on Apr. 23, 2014.

(51) Int. Cl.
| | |
|---|---|
| *F01D 5/18* | (2006.01) |
| *F01D 5/20* | (2006.01) |
| *F01D 11/08* | (2006.01) |

(52) U.S. Cl.
CPC ............. *F01D 5/187* (2013.01); *F01D 5/186* (2013.01); *F01D 5/20* (2013.01); *F01D 11/08* (2013.01); *Y02T 50/676* (2013.01)

(58) Field of Classification Search
CPC . F01D 5/186; F01D 5/187; F01D 5/20; F01D 11/08; Y02T 50/676
See application file for complete search history.

(56) References Cited

U.S. PATENT DOCUMENTS

| | | | |
|---|---|---|---|
| 5,183,385 A | 2/1993 | Lee et al. | |
| 5,269,653 A * | 12/1993 | Evans | F01D 5/186 |
| | | | 415/115 |
| 6,224,336 B1 | 5/2001 | Kercher | |
| 6,923,623 B2 | 8/2005 | Cleveland et al. | |
| 7,641,444 B1 | 1/2010 | Liang | |
| 7,909,581 B2 * | 3/2011 | Klein | C23C 14/042 |
| | | | 416/241 B |
| 8,328,517 B2 | 12/2012 | Liang | |

(Continued)

FOREIGN PATENT DOCUMENTS

| | | |
|---|---|---|
| EP | 1059419 A1 | 12/2000 |
| EP | 1655454 A1 | 5/2006 |

(Continued)

OTHER PUBLICATIONS

European Search Report for European Patent Application No. 15163569.5 dated Sep. 16, 2015.

*Primary Examiner* — Igor Kershteyn

(74) *Attorney, Agent, or Firm* — Carlson, Gaskey & Olds, P.C.

(57) ABSTRACT

A gas turbine engine component according to an exemplary aspect of this disclosure includes a peripheral portion defining an internal cooling passage and a recess in fluid communication with the internal cooling passage. The peripheral portion includes an outer wear surface, and the recess tapers toward the outer wear surface.

16 Claims, 2 Drawing Sheets

(56) References Cited

U.S. PATENT DOCUMENTS

| | | | |
|---|---|---|---|
| 2003/0231955 A1* | 12/2003 | Barry | F01D 5/186 415/115 |
| 2009/0074576 A1* | 3/2009 | Brostmeyer | F01D 5/187 416/95 |
| 2011/0189015 A1* | 8/2011 | Shepherd | F01D 5/186 416/95 |
| 2013/0266454 A1 | 10/2013 | Mongillo, Jr. et al. | |
| 2014/0010632 A1 | 1/2014 | Spangler et al. | |

FOREIGN PATENT DOCUMENTS

| | | |
|---|---|---|
| EP | 2354453 A1 | 8/2011 |
| EP | 2873806 A1 | 5/2015 |

* cited by examiner

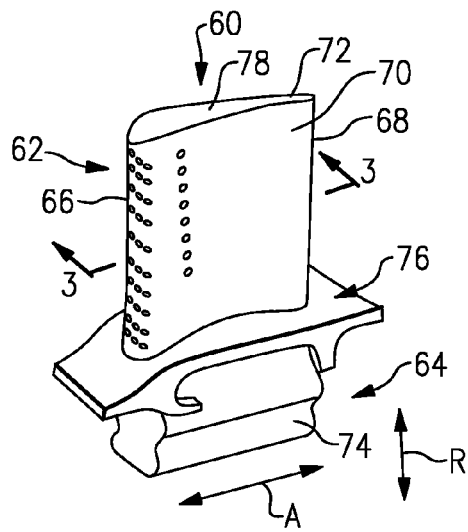
FIG.2
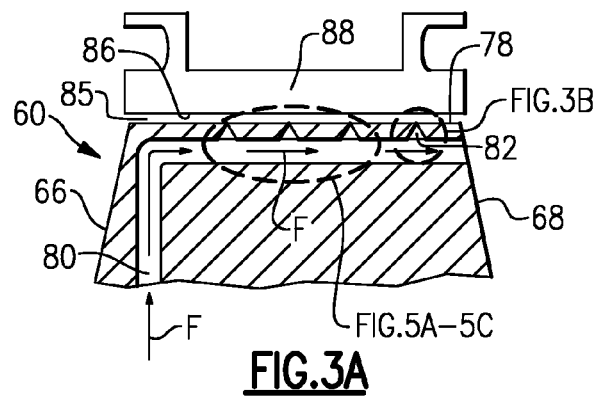
FIG.3A
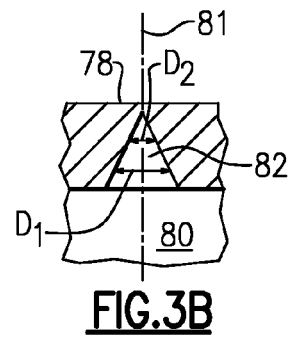
FIG.3B
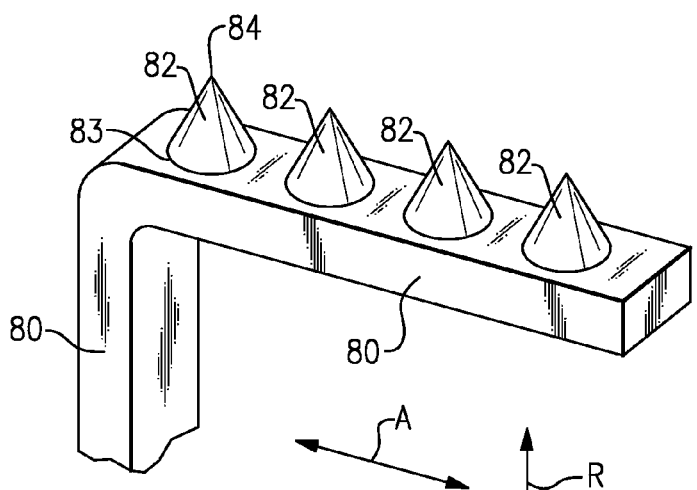
FIG.4
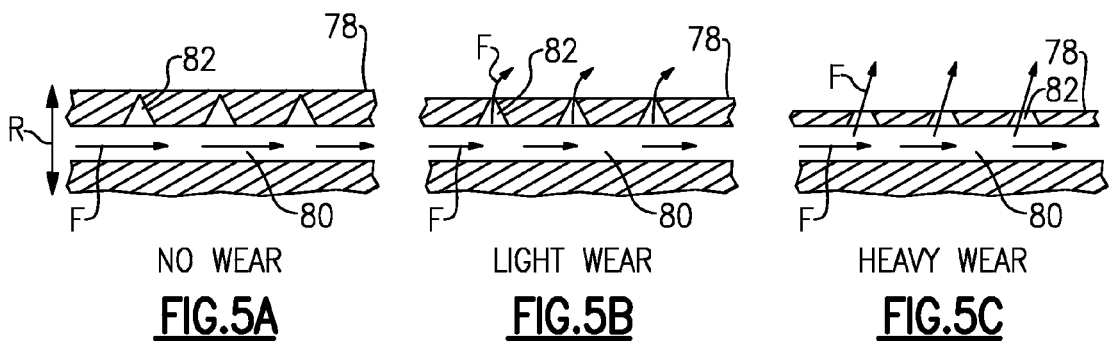
NO WEAR
FIG.5A
LIGHT WEAR
FIG.5B
HEAVY WEAR
FIG.5C

ENGINE COMPONENT WITH WEAR SURFACE PROTECTION

BACKGROUND

Gas turbine engines typically include a compressor section, a combustor section, and a turbine section. During operation, air is pressurized in the compressor section, and mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into a core airflow path of the gas turbine engine. In some example engines, the turbine section may include blade outer air seals (BOAS) provided adjacent the rotating blades to prevent leakage of the hot combustion gases.

SUMMARY

A gas turbine engine component according to an exemplary aspect of this disclosure includes a peripheral portion defining an internal cooling passage and a recess in fluid communication with the internal cooling passage. The peripheral portion includes an outer wear surface, and the recess tapers toward the outer wear surface.

In a further embodiment of the foregoing component, the wear surface covers the recess in a first condition.

In a further embodiment of the foregoing component, the wear surface is configured to define an opening which fluidly couples the internal cooling passage to a region outside of the component via the recess in a second condition.

In a further embodiment of the foregoing component, the wear surface of the peripheral portion is configured to contact an adjacent component, and contact between the wear surface and the adjacent component abrades the wear surface from the first condition to the second condition and uncovers the recess.

In a further embodiment of the foregoing component, the peripheral portion is part of a rotor blade and the adjacent component is a blade outer air seal, and wherein the wear surface is a tip of the rotor blade.

In a further embodiment of the foregoing component, the internal cooling passage is in communication with a source of fluid, and wherein a portion of the internal cooling passage extends axially in a direction from a leading edge of the peripheral portion to a trailing edge of the peripheral portion.

In a further embodiment of the foregoing component, the recess extends radially from the internal cooling passage toward the wear surface.

In a further embodiment of the foregoing component, the recess is frustoconical in shape.

In a further embodiment of the foregoing component, the recess has a diameter which decreases toward the wear surface.

In a further embodiment of the foregoing component, the peripheral portion defines a plurality of recesses in fluid communication with the internal cooling passage, and wherein inner dimensions of each of the plurality of recesses decrease as the recesses approach the wear surface.

A gas turbine engine component according to another exemplary aspect of this disclosure includes a structure having a peripheral outer surface and defining an internal cooling passage and a recess in fluid communication with the internal cooling passage. The peripheral outer surface includes a wear surface configured to (1) cover the recess in a first condition and (2) to uncover the recess in a second condition. Further, the internal cooling passage is fluidly coupled to a region outside the structure via the recess in the second condition.

In a further embodiment of the foregoing component, contact between the wear surface and another component uncovers the recess.

In a further embodiment of the foregoing component, the component is a rotor blade, and wherein the wear surface is a tip of the rotor blade.

In a further embodiment of the foregoing component, the internal cooling passage is in communication with a source of fluid, and a portion of the internal cooling passage extends axially in a direction from a leading edge of the component to a trailing edge of the component.

An assembly for a gas turbine engine according to a further aspect of this disclosure includes an abradable component and an abrasive component adjacent the abradable component. The abrasive component has a wear surface and is configured to move relative to the abradable component during operation of the engine. Further, the abrasive component includes an internal cooling passage and a recess in fluid communication with the internal cooling passage. The recess is tapered toward the wear surface of the abrasive component.

In a further embodiment of the foregoing assembly, the wear surface covers the recess in a first condition.

In a further embodiment of the foregoing component, the wear surface uncovers the recess in a second condition, and the internal cooling passage is fluidly coupled to a region outside the structure via the recess in the second condition.

In a further embodiment of the foregoing component, the abradable component is a blade outer air seal and the abrasive component is a rotor blade, and wherein the wear surface is a tip of the rotor blade.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 2 is a perspective view of an example gas turbine engine component.

FIG. 3A illustrates a portion of the example engine component from FIG. 2 in cross-section, and illustrates an adjacent blade outer air seal (BOAS).

FIG. 3B is an enlarged view of a portion of the encircled area of FIG. 3A.

FIG. 4 illustrates an example cooling flow path and a plurality of recesses according to this disclosure, in negative.

FIGS. 5A-5C are enlarged views of the encircled area from FIG. 3A, and illustrate the tip of the engine component with various levels of wear.

DETAILED DESCRIPTION

Figure 1:
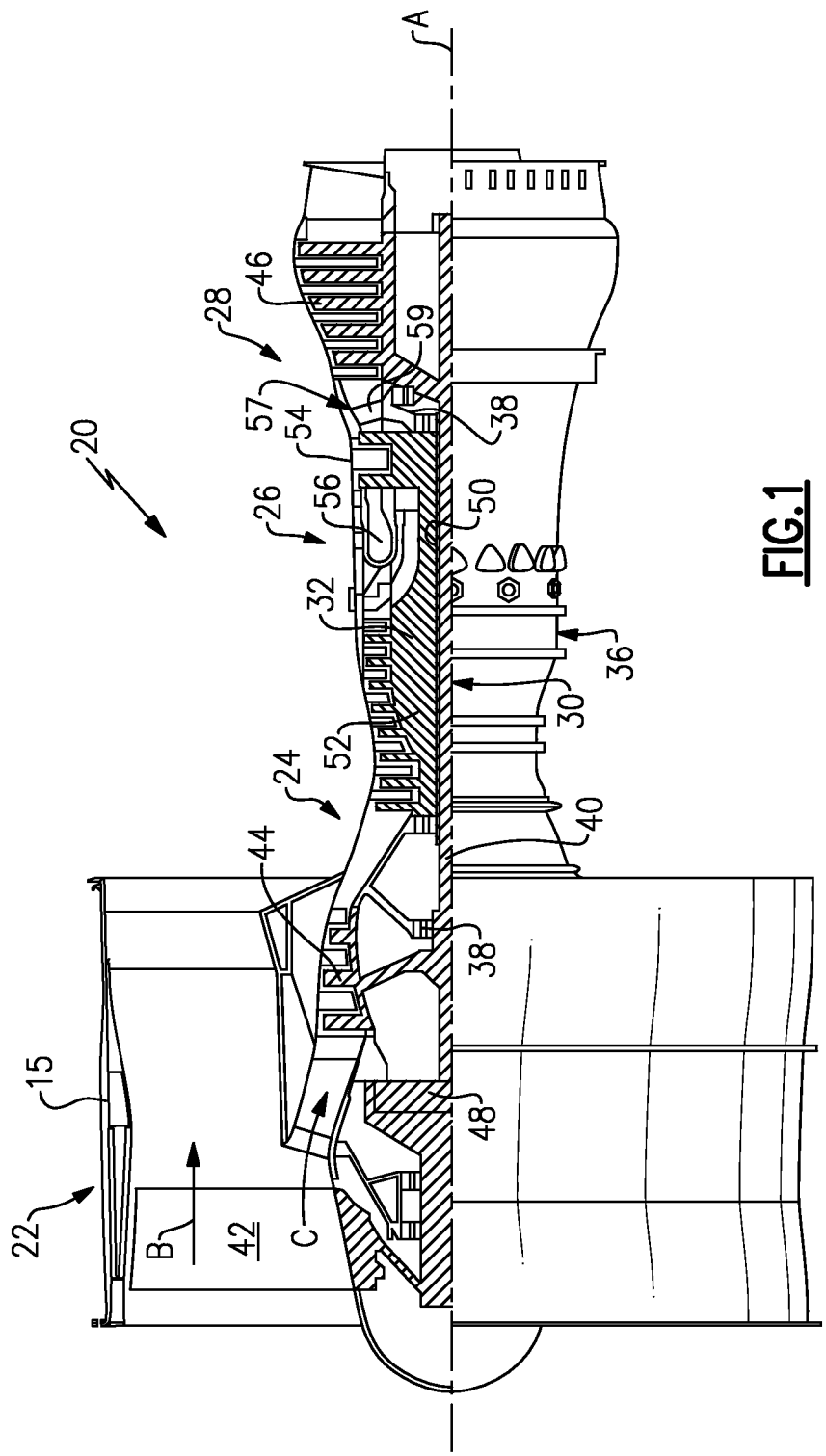
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

FIG. 2 is a perspective view of an example engine component 60. In this example, the engine component 60 is a rotor blade provided within the turbine section 28 of the engine 20 of FIG. 1. It should be understood, however, that this disclosure extends to other engine components, such as stator vanes and blade outer air seals (BOAS). Further, while a turbine blade is illustrated, this disclosure applies to components within other sections of the engine 20.

The engine component 60 includes an airfoil section 62 and an attachment section 64. The airfoil section 62 includes a leading edge 66, a trailing edge 68, and opposed pressure and suction sidewalls 70, 72 extending from the leading edge 66 to the trailing edge 68. The attachment section 64 in this example includes a fir tree root 74, although other types of attachments, such as dovetails, come within the scope of this disclosure. Further, in this example, the component includes a platform 76 between the airfoil section 62 and the attachment section 64. The airfoil section 62 extends radially (in a radial direction R, normal to the engine central longitudinal axis A) from the platform 76 to a tip 78 of the component 60.

FIG. 3A is a partial cross-sectional view of the component 60, taken along line 3-3 of FIG. 2. As shown in FIG. 3A, the component 60 includes an internal passageway 80 for routing a flow of cooling fluid F within the component 60. While only one internal passageway is illustrated, it should be understood that the component 60 may include additional internal passageways.

In this example, the internal passageway 80 extends radially, adjacent the leading edge 66, toward the tip 78. Adjacent the tip 78, the internal passageway 80 turns axially and extends toward the trailing edge 68. While the illustrated internal passageway 80 has a radially extending portion adjacent the leading edge 66, the internal passageway does not need to be provided adjacent the leading edge 66 in all examples. Further, the axially extending portion (near the tip 78) of the internal passageway 80 could flow from the trailing edge 68 toward the leading edge 66.

In accordance with the present disclosure, the component 60 defines the internal passageway 80 in communication with a plurality of recesses 82, which are also defined by the component 60 and extend from the internal passageway 80 toward the tip 78. While in this example the recesses 82 are adjacent the tip 78, in other embodiments the recesses 82 may be provided adjacent another wear surface of the component 60. Further, while a plurality of recesses 82 are illustrated, it will be appreciated that this disclosure extends to examples having a single recess in communication with an internal cooling passage of the component 60.

Continuing with reference to FIG. 3A, the recesses 82 are defined by the component 60 to taper toward the tip 78. That is, as recesses 82 approach the tip 78, an inner dimension of the recesses 82 decreases. For example, in FIG. 3B, the recess 82 is arranged about a centerline 81, which extends perpendicular to an adjacent portion of the internal passageway 80. In this example, the centerline 81 is parallel to the radial direction R. Further, the recess 82 establishes first and second inner dimensions $D_1$ and $D_2$. The first inner dimension $D_1$, which is closer to the internal passageway 80, is larger than the second inner dimension $D_2$, which is closer to the tip 78.

FIG. 4 is a perspective view illustrating the internal passageway 80 and the recesses 82 in negative for purposes of visualization. The internal passageway 80 and the recesses 82 may be formed through an investment casting process. Alternatively, an additive manufacturing process can be used. Other manufacturing methods come within the scope of this disclosure, however.

As shown in FIG. 4, the recesses 82 are frustoconical in shape, with a base 83 in open communication with the internal passageway 80, and an apex 84 adjacent the tip 78. This disclosure extends to other shapes, including pyramid-like shapes, with a decreasing inner dimension approaching a wear surface. Further, it should be understood that the recesses 82 may be arranged in any desired manner. For example, additional cooling may be desired adjacent the leading edge 66. In that instance, additional recesses can be defined by the component 60 adjacent the leading edge 66.

The engine component 60 is configured to rotate about the engine central longitudinal axis A. During operation of the engine 20, the tip 78 may come into contact with, for example, an inner surface 86 of a blade outer air seal (BOAS) 88 (shown in FIG. 3A). As the tip 78 is generally an abrasive component and the BOAS 88 is generally an abradable component, when the tip 78 and BOAS 88 contact one another, the tip 78 typically abrades the BOAS 88. However, over time, the tip 78 may wear as well. For purposes of this disclosure, both the tip 78 and the inner surface 86 are referred to as wear surfaces because contact between them leading to wearing of one or both of them is anticipated during operation of the engine 20. This disclosure extends to other wear surfaces, and is not limited to the tip 78 and the inner surface 86.

FIG. 5A illustrates the engine component 60 in an unworn condition. In this condition, there has been little, or no, contact between the engine component 60 and the BOAS 88. Further, in the condition of FIG. 5A, the fluid F is not capable of exiting the component via the recesses 82 because the recesses 82 are radially covered by the tip 78.

After contact (or, rubbing) between the tip 78 and the BOAS 88, the tip 78 begins to wear in the radial direction R. After a certain level of wear, the recesses 82 are exposed and act as cooling holes (FIG. 5B), thus fluidly coupling fluid F from the internal cooling passageway 80 to the space 85 (FIG. 3A) between surface 86 and tip 78 via recesses 82, which increases cooling of the tip 78 relative its cooling in the condition shown in FIG. 5A.

After additional contact between the tip 78 and the BOAS 88, the tip 78 is further worn, as illustrated in FIG. 5C. Because of the tapered nature of the recesses 82 (discussed above), the cooling holes in the tip 78 have a larger dimension (e.g., diameter) in FIG. 5C than in FIG. 5B, which allows more fluid F to exit the internal passageway 80. Increasing the dimension of the cooling holes in the tip 78 increases film cooling adjacent the tip 78. Accordingly, this disclosure provides protection to a wear surface (here, the tip 78), by providing increased cooling as the surface wears. As increased cooling is provided to the tip 78, the tip 78 becomes cooler than the inner surface 86 of the BOAS 88, and thus enhances the ability of the engine component 60 to cut the BOAS 88.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine component, comprising:
a peripheral portion defining an internal cooling passage and a recess in fluid communication with the internal cooling passage, the peripheral portion including an outer wear surface, wherein the recess tapers toward the outer wear surface, wherein the wear surface covers the recess in a first condition, wherein the wear surface is configured to define an opening which fluidly couples the internal cooling passage to a region outside of the component via the recess in a second condition, wherein the wear surface of the peripheral portion is configured to contact an adjacent component, and wherein contact between the wear surface and the adjacent component abrades the wear surface from the first condition to the second condition and uncovers the recess.

2. The component as recited in claim 1, wherein the peripheral portion is part of a rotor blade and the adjacent component is a blade outer air seal, and wherein the wear surface is a tip of the rotor blade.

3. The component as recited in claim 1, wherein the internal cooling passage is in communication with a source of fluid, and wherein a portion of the internal cooling passage extends axially in a direction from a leading edge of the peripheral portion to a trailing edge of the peripheral portion.

4. The component as recited in claim 3, wherein the recess extends radially from the internal cooling passage toward the wear surface.

5. The component as recited in claim 1, wherein the recess is frustoconical in shape.

6. The component as recited in claim 5, wherein the recess has a diameter which decreases toward the wear surface.

7. The component as recited in claim 1, wherein the peripheral portion defines a plurality of recesses in fluid communication with the internal cooling passage, and wherein inner dimensions of each of the plurality of recesses decrease as the recesses approach the wear surface.

8. A gas turbine engine component, comprising:
a structure having a peripheral outer surface and defining an internal cooling passage and a recess in fluid communication with the internal cooling passage, wherein the peripheral outer surface includes a wear surface configured to (1) cover the recess in a first condition and (2) to uncover the recess in a second condition, wherein the internal cooling passage is fluidly coupled to a region outside the structure via the recess in the second condition, wherein the recess is tapered toward the wear surface.

9. The component as recited in claim 8, wherein contact between the wear surface and another component uncovers the recess.

10. The component as recited in claim 9, wherein the component is a rotor blade, and wherein the wear surface is a tip of the rotor blade.

11. The component as recited in claim 8, wherein the internal cooling passage is in communication with a source of fluid, and wherein a portion of the internal cooling passage extends axially in a direction from a leading edge of the component to a trailing edge of the component.

12. The component as recited in claim 8, wherein the recess is frustoconical in shape, and wherein the recess has a diameter which decreases toward the wear surface.

13. An assembly for a gas turbine engine, the assembly comprising:
an abradable component; and
an abrasive component adjacent the abradable component, the abrasive component having a wear surface and configured to move relative to the abradable component during operation of the engine, the abrasive component including an internal cooling passage and a recess in fluid communication with the internal cooling passage, wherein the recess is tapered toward the wear surface of the abrasive component.

14. The assembly as recited in claim 13, wherein, in a first condition, the wear surface covers the recess.

15. The engine as recited in claim 14, wherein, in a second condition, the wear surface uncovers the recess, and wherein the internal cooling passage is fluidly coupled to a region outside the structure via the recess in the second condition.

16. The engine as recited in claim 15, wherein the abradable component is a blade outer air seal and the abrasive component is a rotor blade, and wherein the wear surface is a tip of the rotor blade.

* * * * *